United States Patent
Biancalana et al.

(10) Patent No.: US 10,603,995 B2
(45) Date of Patent: Mar. 31, 2020

(54) CAR WITH TARGA TOP BODY PROVIDED WITH SUNROOF OR OPEN ROOF

(71) Applicant: FERRARI S.P.A., Modena (IT)

(72) Inventors: Matteo Biancalana, Modena (IT); Giuseppe Cuzzillo, Modena (IT)

(73) Assignee: FERRARI S.P.A., Modena (IT)

( * ) Notice: Subject to any disclaimer, the term of this patent is extended or adjusted under 35 U.S.C. 154(b) by 144 days.

(21) Appl. No.: 15/883,145

(22) Filed: Jan. 30, 2018

(65) Prior Publication Data

US 2018/0222297 A1    Aug. 9, 2018

(30) Foreign Application Priority Data

Jan. 30, 2017  (IT) ........................ 102017000009662

(51) Int. Cl.
  *B60J 7/22*    (2006.01)
  *B60J 7/10*    (2006.01)

(52) U.S. Cl.
  CPC .............. *B60J 7/223* (2013.01); *B60J 7/106* (2013.01)

(58) Field of Classification Search
  CPC .............. B60J 7/106; B60J 7/22; B60J 7/223
  USPC .................... 296/180.1, 181.4, 217
  See application file for complete search history.

(56) References Cited

U.S. PATENT DOCUMENTS

| | | | | |
|---|---|---|---|---|
| 5,253,916 A * | 10/1993 | Moore | ................. | B60J 7/223 296/180.5 |
| 7,963,559 B2 * | 6/2011 | Ballard | ................. | B60Q 1/2661 280/756 |
| 2005/0140172 A1 * | 6/2005 | Sogame | ................. | B60J 7/223 296/180.1 |
| 2008/0001428 A1 * | 1/2008 | Pehrson | ................. | B60J 7/223 296/180.1 |
| 2008/0067834 A1 * | 3/2008 | Erb | ................. | B60J 7/19 296/180.1 |
| 2011/0000727 A1 * | 1/2011 | Froeschle | ................. | B60J 1/2008 180/68.1 |
| 2011/0001329 A1 * | 1/2011 | Froeschle | ................. | B60J 1/2008 296/76 |
| 2013/0257088 A1 * | 10/2013 | Noble | ................. | B60J 1/20 296/96.11 |
| 2015/0298530 A1 * | 10/2015 | Pennington | ................. | B60Q 1/50 296/180.1 |

(Continued)

FOREIGN PATENT DOCUMENTS

| DE | 199908502 C1 | 5/2000 |
|---|---|---|
| EP | 0895889 A2 | 10/1999 |
| EP | 2062769 A1 | 5/2009 |

(Continued)

OTHER PUBLICATIONS

Search Report issued in Italian Patent Application No. 201700009662, dated Nov. 2, 2017; 8 pages.

*Primary Examiner* — Jason S Morrow
(74) *Attorney, Agent, or Firm* — Cantor Colburn LLP

(57) ABSTRACT

A car having: a passenger compartment; a windshield, which defines the passenger compartment at the front; a roll bar, which defines the passenger compartment at the rear; a pair of seats, which are arranged inside the passenger compartment between the windshield and the roll bar; a rear parcel shelf, which is arranged inside the passenger compartment behind the seats; and a protection panel, which is arranged inside the passenger compartment and projects for the rear parcel shelf.

14 Claims, 5 Drawing Sheets

(56) References Cited

U.S. PATENT DOCUMENTS

2019/0160927 A1* 5/2019 Saka .................... B60J 7/223

FOREIGN PATENT DOCUMENTS

| WO | 9403342 | A1 | 2/1994 |
| WO | 2006058703 | A1 | 6/2006 |

* cited by examiner

CAR WITH TARGA TOP BODY PROVIDED WITH SUNROOF OR OPEN ROOF

PRIORITY CLAIM

This application claims priority from Italian Patent Application No. 102017000009662 filed on Jan. 30, 2017, the disclosure of which is incorporated by reference.

TECHNICAL FIELD

The present invention relates to a car with a "Targa Top" body, provided with a sunroof or open roof.

The present invention finds advantageous application to a car with a "Targa Top" body (or, for short, "Targa") with a sunroof, to which the following description will make explicit reference without losing its generality.

PRIOR ART

The "Targa" car body is a type of car body halfway between the "coupe" body and the "spider" body. It actually is a "coupe" body with a rigid roof (often made of a plastic material to have a reduced weight and therefore be easily handled by one person) that is removable and is supported at the front by the upright of the windshield and at the rear by a robust full-width roll bar, which is integrated into the body and is (generally) provided with a centrally arranged transparent rear window. The "Targa" body began to spread in the second half of the Sixties and enjoyed a good success throughout the Seventies; currently the "Targa" body is essentially used for high-performance sports cars. For example, a car with the "Targa" body is described in the patent application DE102008028668A1.

A significant aerodynamic turbulence, annoying for the occupants of the passenger compartment, has been observed by traveling at a high speed in the passenger compartment in a car with the "Targa" body when the roof is removed. Such aerodynamic turbulence is essentially due to air flows which, after having passed the upright of the windshield, sink below the roll bar (i.e. enter the passenger compartment from above) until they hit the rear window and, after impacting against the rear window, "bounce" towards the two passengers, thus hitting them from behind (very annoying).

In order to get rid of such aerodynamic turbulence it has been proposed to increase the height of the upright of the windshield (possibly also with a false insert to be installed only when the roof is removed) so that the upright of the windshield is adequately higher than the rear roll bar (approximately 3-5 cm higher than the rear roll bar). However, this solution involves a significant increase in the car's front section and therefore an increase in the aerodynamic resistance of the car (i.e. a deterioration in both speed performance and fuel consumption).

DESCRIPTION OF THE INVENTION

The object of the present invention is to provide a car with a "Targa Top" body provided with a sunroof or open roof, said car being free from the aforementioned drawbacks and, at the same time, being also easy and inexpensive to manufacture.

According to the present invention, it is provided a car with a "Targa Top" body provided with a sunroof or open roof, as claimed in the appended claims.

BRIEF DESCRIPTION OF THE DRAWINGS

The present invention will now be described with reference to the accompanying drawings showing an example of non-limiting embodiment, in which.

PREFERRED EMBODIMENTS OF THE INVENTION

Figure 1:
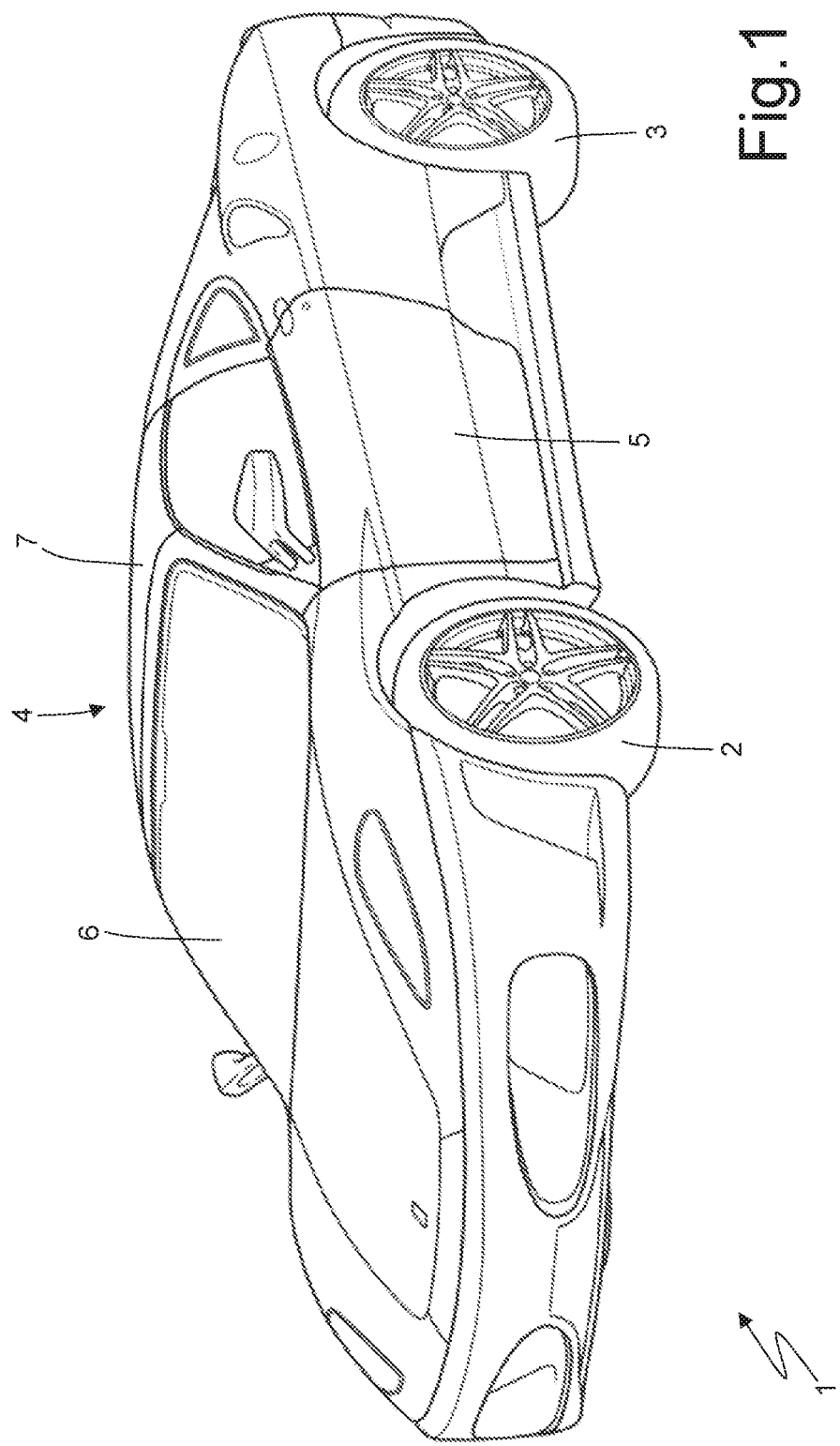
FIG. 1 is a front perspective view of a car manufactured in accordance with the present invention.
Figure 2:
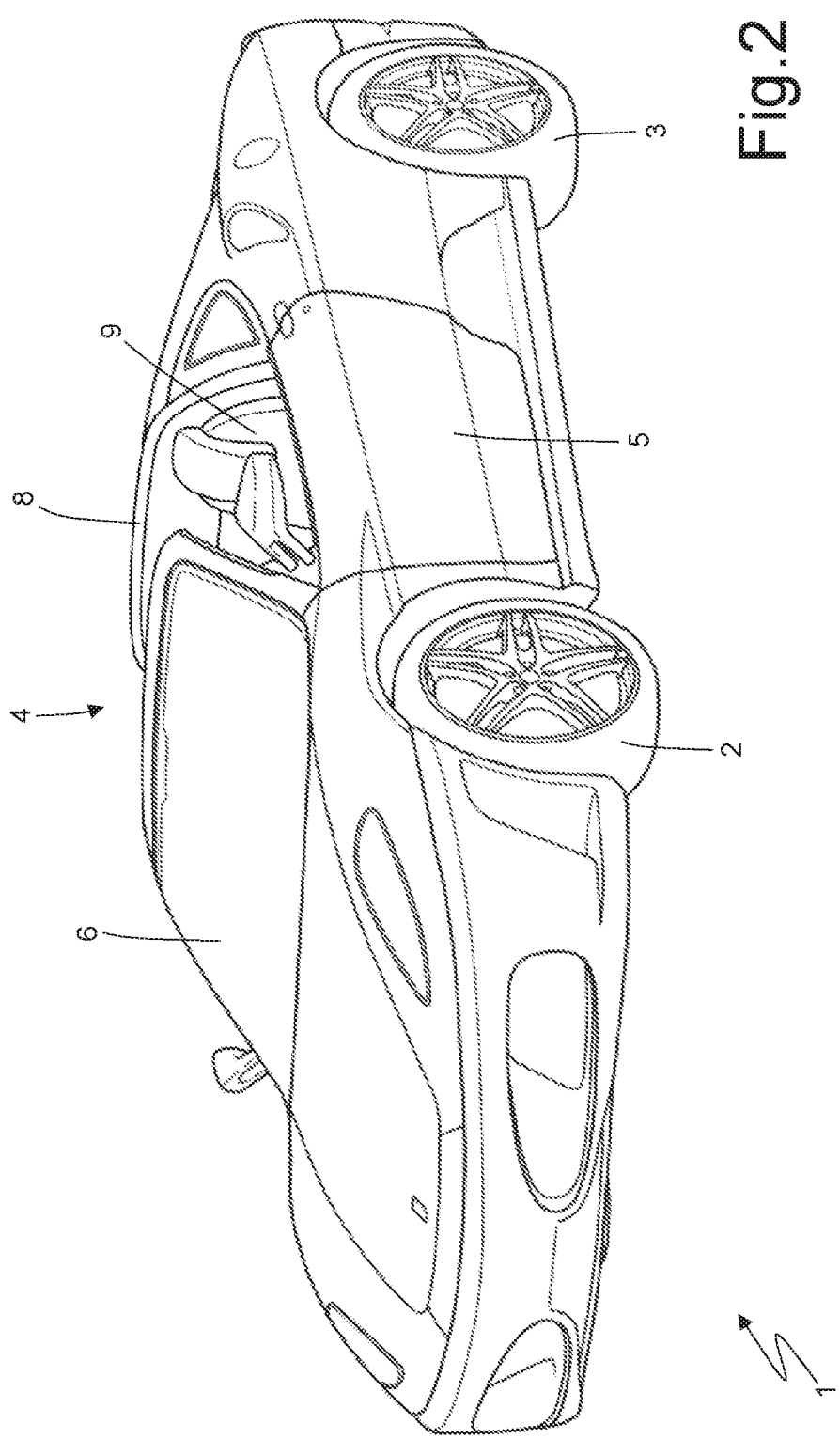
FIG. 2 is a front perspective view of the car of FIG. 1 with the roof removed.

In FIGS. 1 and 2, the reference number 1 indicates as a whole a car driven by a centrally arranged internal combustion engine. The car 1 comprises a chassis, which supports the internal combustion engine, a pair of front wheels 2 and a pair of rear wheels 3.

Figure 4:
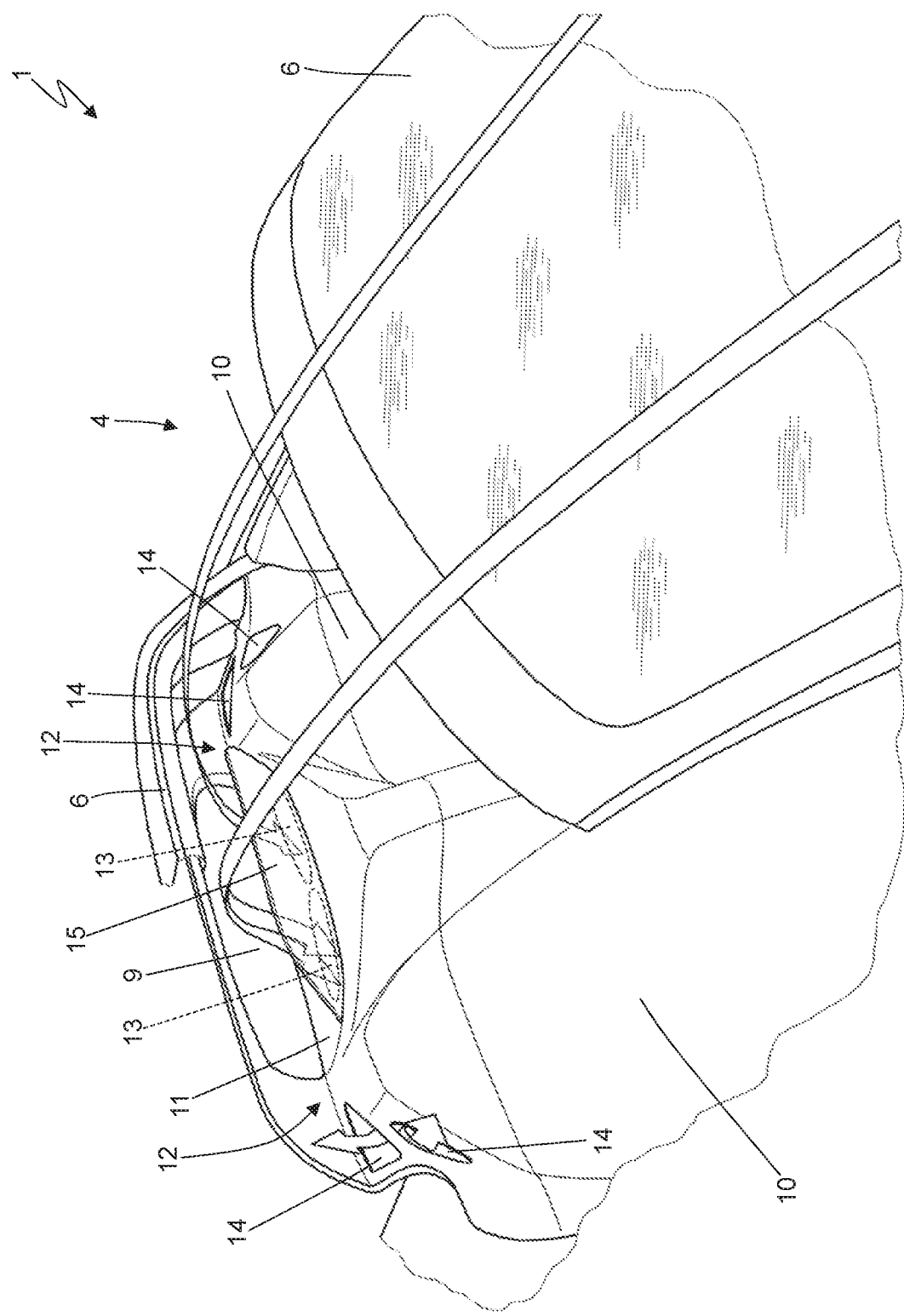
FIGS. 4 and 5 are two perspective and schematic views of the passenger compartment of FIG. 3 showing the air flows when the roof is removed.
Figure 5:
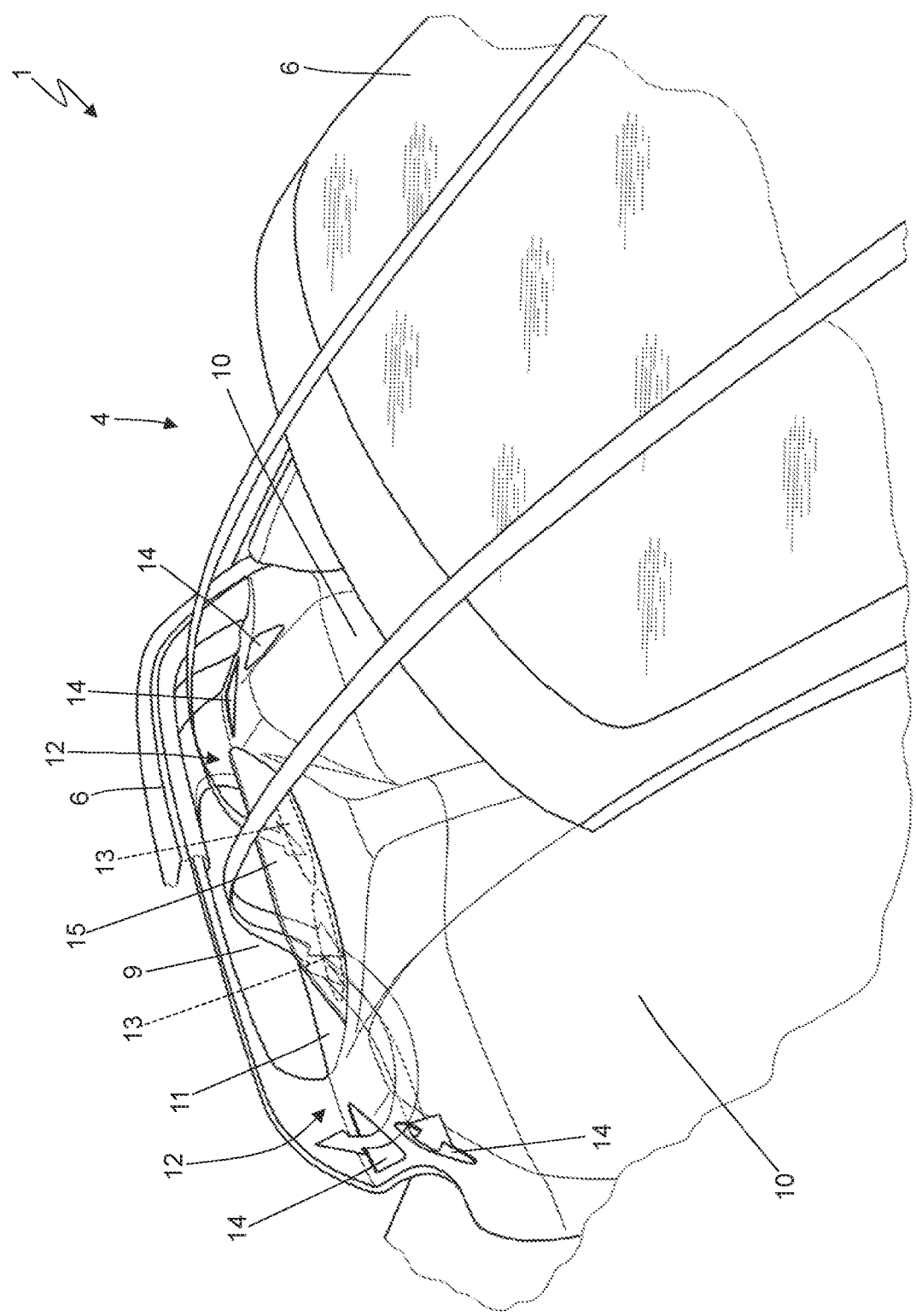

Between the front wheels 2 and the rear wheels 3 there is a passenger compartment 4, which can be accessed through a pair of doors 5. Behind the passenger compartment 4 and in a central position there is a motor compartment housing the internal combustion engine. The chassis is covered by a body that includes, among other things, the doors 5, a transparent windshield 6, which is enclosed by an upright rigidly connected to the chassis and defining the passenger compartment 4, and a roof 7, which defines from above the passenger compartment 4. The roof 7 is supported at the front by the upright of the windshield 6 and at the rear by a full-width roll bar 8, which is integrated into the body (i.e. is rigidly connected to the chassis), has an inverted "U" shape and is provided with a centrally arranged (as shown in FIGS. 3, 4 and 5) and fixed (i.e. with no moving components) transparent rear window 9.

In the car 1 shown in the attached figures, the upright of the windshield 6 has the same height as the roll bar 8 and therefore the roof 7 is substantially horizontal when it rests at the front on the upright of the windshield 6 and at the rear on the roll bar 8.

The car body 1 is of the "Targa" type and therefore the roof 7 covering the passenger compartment 4 from above can be removed. FIG. 1 shows the car 1 with the roof 7, whereas FIG. 2 shows the car 1 without the roof 7 (i.e. with the passenger compartment 4 open at the top).

Figure 3:
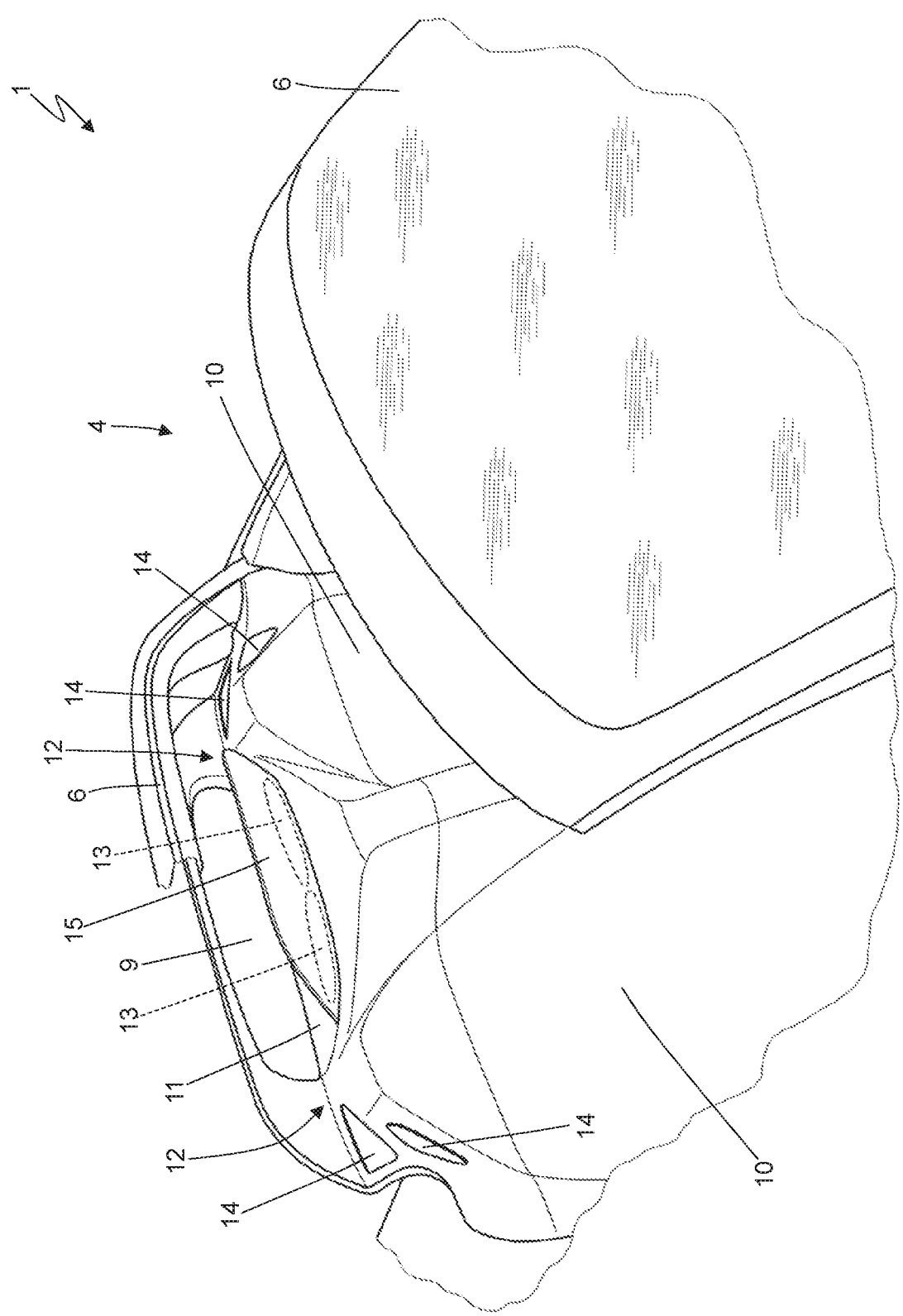
FIG. 3 is a perspective and schematic view of part of a passenger compartment of the car of FIG. 1 when the roof is removed.

As better shown in FIG. 3, in the passenger compartment 4 two seats 10 are arranged side by side (generally a seat 10 on the left for the driver and a seat 10 on the right for a possible passenger or vice versa in the case of right-hand drive). The two seats 10 are positioned between the windshield 6 (which is arranged before the seats 10) and the roll bar 8 (which is arranged behind the seats 10). Each seat 10 comprises a sitting element (substantially horizontal) and a backrest (substantially vertical) ending at the top with a headrest.

The passenger compartment 4 contains a rear parcel shelf 11 (i.e. a hatbox), which is arranged inside the passenger compartment 4 behind the seats 10 and is substantially horizontal; furthermore, the rear parcel shelf 11 is arranged below the roll bar 8 and in front of the transparent rear window 9. In particular, the rear parcel shelf 11 has a greater length (i.e. a greater longitudinal dimension) between the two seats 10 and has a shorter length (i.e. a smaller longitudinal dimension) at the two seats 10. In other words, the rear parcel shelf 11 projects with a swelling between the two seats 10.

Two vent channels 12 are provided, each of which starts at an inlet opening 13 formed through the rear parcel shelf 11 and ends in two adjacent and separate outlet openings 14; the two vent channels 12 are alike and symmetrical and are arranged one on the right and one on the left. Preferably, the inlet openings 13 of the vent channels 12 are limited to a region of the rear parcel shelf 11 arranged between the headrests of the two seats 10.

The embodiment shown in the accompanying figures provides two vent channels 12, each comprising a single inlet opening 13 and two different outlet openings 14. Other embodiments that are perfectly equivalent and not shown provide a different number of vent channels 12 (e.g. a single vent channel 12 or three or four vent channels 12) and/or each vent channel 12 has a different number of inlet openings 13 (e.g. two or three separate inlet openings 13) and/or each vent channel 12 has a different number of outlet openings 14 (e.g. a single outlet opening 14 or three or four outlet openings 14).

In the embodiment shown in the attached figures, the outlet openings 14 of the vent channels 12 are arranged inside the passenger compartment 4. In an alternative embodiment that is perfectly equivalent and not shown, the outlet openings of the vent channels 12 are arranged out of the passenger compartment 4, e.g. the outlet openings 14 of the vent channels 12 may lead to the engine compartment or outside through the car body or through the vehicle floor.

In the embodiment shown in the accompanying figures, the outlet openings 14 of the vent channels 12 are arranged behind the seats 10 near the doors 5 giving access to the passenger compartment 4. Preferably, the outlet openings 14 of the vent channels 12 are oriented towards the outside of the passenger compartment 4. Preferably, the outlet openings 14 of the vent channels 12 are arranged above the beltline of the doors 5 (i.e. at the movable glass windows of the doors 5). Preferably, the outlet openings 14 of the vent channels 12 are arranged behind the headrests of the seats 10.

A protection panel 15, arranged inside the passenger compartment 4 in front of the transparent rear window 9, projects from the rear parcel shelf 11 towards the roll bar 8 and is arranged in front of the inlet openings 13 of the vent channels 12. The protection panel 15 is fixed, namely is rigidly connected to the rear parcel shelf 11 and cannot move with respect to the rear parcel shelf 11, thus maintaining the same position (i.e. it can never modify its position with respect to the rear parcel shelf).

Furthermore, the protection panel 15 is completely airtight, i.e. it does not allow any air passage. Consequently, the air can pass over or alongside the protection panel 15, but it can never go through the protection panel 15; this result is obtained by manufacturing the protection panel 15 in a solid and full (i.e. without holes) material. Generally, the protection panel 15 is transparent (i.e. made of glass or transparent plastic material) not to block the view through the rear window 9. Preferably, the protection panel 15 forms an acute angle (and obviously a complementary obtuse angle) with the rear parcel shelf 11 and slopes down towards the windshield 6. Preferably, the protection panel 15 has an upper edge, which is spaced from the roll bar 8 to leave a free passage between the upper edge of the protection panel 15 and the roll bar 8. Preferably, the upper edge of the protection panel 15 is lower than the roll bar 8. Preferably, the protection panel 15 has a curved "eyelid" shape.

With reference to FIGS. 4 and 5, it is described the operation of the vent channels 12 when the car 1 travels without the roof 7 (namely with the open roof 7).

After having passed the upright of the windshield 6, some air flows due to the advancement of the car 1 sink below the roll bar 8 (i.e. enter the passenger compartment 4 from above). In particular, such air flows tend to slip between the upper edge of the protection panel 15 (which is lower than the roll bar 8) and the roll bar 8, and therefore tend to concentrate in the space between the rear window 9 and the protection panel 15. In other words, the air flows which, after having passed the upright of the windshield 6, sink below the roll bar 8 (i.e. enter the passenger compartment 4 from above), "slide" into the space between the rear window 9 and the protection panel 15, going through the passage between the roll bar 8 and the protection panel 15. Such air flows are only slightly lower than the windshield 6 (and therefore the roll bar 8), particularly when traveling at high speeds, and as a result even a small free passage area between the rear window 9 and the protection panel 15 is enough to "catch" almost all of these air flows. The air flows entering the defined space between the rear window 9 and the protection panel 15 tend to increase the local pressure and then vent, i.e. exit, through the two vent channels 12, entering the inlet openings 13 and exiting the outlet openings 14.

When the outlet openings 14 of the vent channels 12 are oriented towards the windows of the doors 5, the air leakage through the outlet openings 14 creates a kind of "air cushion" at the windows of the doors 5, which prevents the entry of air flows from the outside (obviously when the windows are open), thus improving the aerodynamic penetration of the car 1. In other words, when the car 1 advances, some air flows, after having surpassed the side uprights of the windshield 6, enter the passenger compartment 4 from the side (obviously when the windows are open) and the air blown through the outlet openings 14 of the vent channels 12 at the windows of the doors 5 and outwards prevents/contrasts (at least in part) the air inlet from the outside.

A different embodiment, not shown, provides only the protection panel 15, but not the vent channels 12. In this embodiment, the air flows which are concentrated in the space defined between the rear window 9 and the protection panel 15 (going through the passage area between the roll bar 8 and the protection panel 15) locally increase the pressure, and not being able to vent through the vent channels 12 (no longer present) create side air flows (i.e. parallel to the protection panel 15). In this embodiment, the protection panel 15 preferably has a greater transverse extension so as to end extensively beyond the headrests of the seats 10.

The car 1 described above has numerous advantages.

First, in the car 1 described above, the formation of aerodynamic turbulence inside the passenger compartment 4 is prevented due to the air flows which, after having passed the upright of the windshield 6, sink below the roll bar 8. This result is due to the presence of the protection panel 15 and to the presence of vent channels 12 without any need to (more or less falsely) increase the height of the upright of the windshield 6 beyond the roll bar 8.

Moreover, the car 1 described above is easy and inexpensive to manufacture, as it only requires the addition of a small fixed element (the protection panel 15) and the creation of some "holes" (the openings 13 and 14 of the vent channels 12).

The invention claimed is:

1. A car (1) with "Targa top" body, comprising:
   a chassis;
   a passenger compartment (4);
   a windshield (6), which defines the passenger compartment (4) at the front and is enclosed by an upright rigidly connected to the chassis;
   a full-width roll bar (8), which defines the passenger compartment (4) at the rear, is rigidly connected to the chassis, has an inverted "U" shape and is provided with a fixed transparent rear window (9);
   a pair of seats (10), which are arranged inside the passenger compartment (4), between the windshield (6) and the roll bar (8);
   a rear parcel shelf (11), which is arranged inside the passenger compartment (4) behind the seats (10); and
   a protection panel (15), which is arranged inside the passenger compartment (4) in front of the transparent rear window (9), projects from the rear parcel shelf (11) towards the roll bar (8), is completely air-tight and is fixed, namely is rigidly connected to the rear parcel shelf (11) and cannot move with respect to the rear parcel shelf (11);
   wherein the protection panel (15) has an upper edge, which is spaced from the roll bar (8) so as to leave a free passage between the upper edge of the protection panel (15) and the roll bar (8).

2. A car (1) according to claim 1, wherein the protection panel (15) forms an acute angle with the rear parcel shelf (11) and slopes down towards the windshield (6).

3. A car (1) according to claim 1, wherein: the upright of the windshield (6) has the same height as the roll bar (8); and it is provided a roof (7), which is supported at the front by the upright of the windshield (6) and at the rear by the roll bar (8).

4. A car (1) according to claim 1, wherein the protection panel (15) has an upper edge that is lower than the roll bar (8).

5. A car (1) according to claim 1, wherein the protection panel (15) has a curved "eyelid" shape.

6. A car (1) according to claim 1, wherein the protection panel (15) is transparent.

7. A car (1) according to claim 1 and comprising a vent channel (12) starting at an inlet opening (13), which is formed through the rear parcel shelf (11) and is arranged behind the protection panel (15), ending in an outlet opening (14).

8. A car (1) according to claim 7, wherein the outlet opening (14) of the vent channel (12) is arranged inside the passenger compartment (4).

9. A car (1) according to claim 8, wherein the outlet opening (14) of the vent channel (12) is arranged behind one of said pair of seats (10) close to a door (5) that allows entering the passenger compartment (4).

10. A car (1) according to claim 9, wherein the outlet opening (14) of the vent channel (12) is oriented towards the outside of the passenger compartment (4).

11. A car (1) according to claim 9, wherein the outlet opening (14) of the vent channel (12) is arranged above the belt line of the door (5).

12. A car (1) according to claim 9, wherein the outlet opening (14) of the vent channel (12) is arranged behind a headrest of one of said pair of seats (10).

13. A car (1) according to claim 7, wherein the inlet opening (13) of the vent channel (12) is limited to an area of the rear parcel shelf (11) arranged between the headrests of the two seats (10).

14. A car (1) according to claim 1, wherein the protection panel (15) ends above the headrests of the seats (10).

* * * * *